Aug. 25, 1970  E. M. VAN DORNICK  3,525,604

PROCESS FOR REFINING PELLETIZED METALLIFEROUS MATERIALS

Filed Oct. 21, 1966  3 Sheets-Sheet 1

INVENTOR.
EDWARD M. VAN DORNICK
By White & Haefliger
ATTORNEYS.

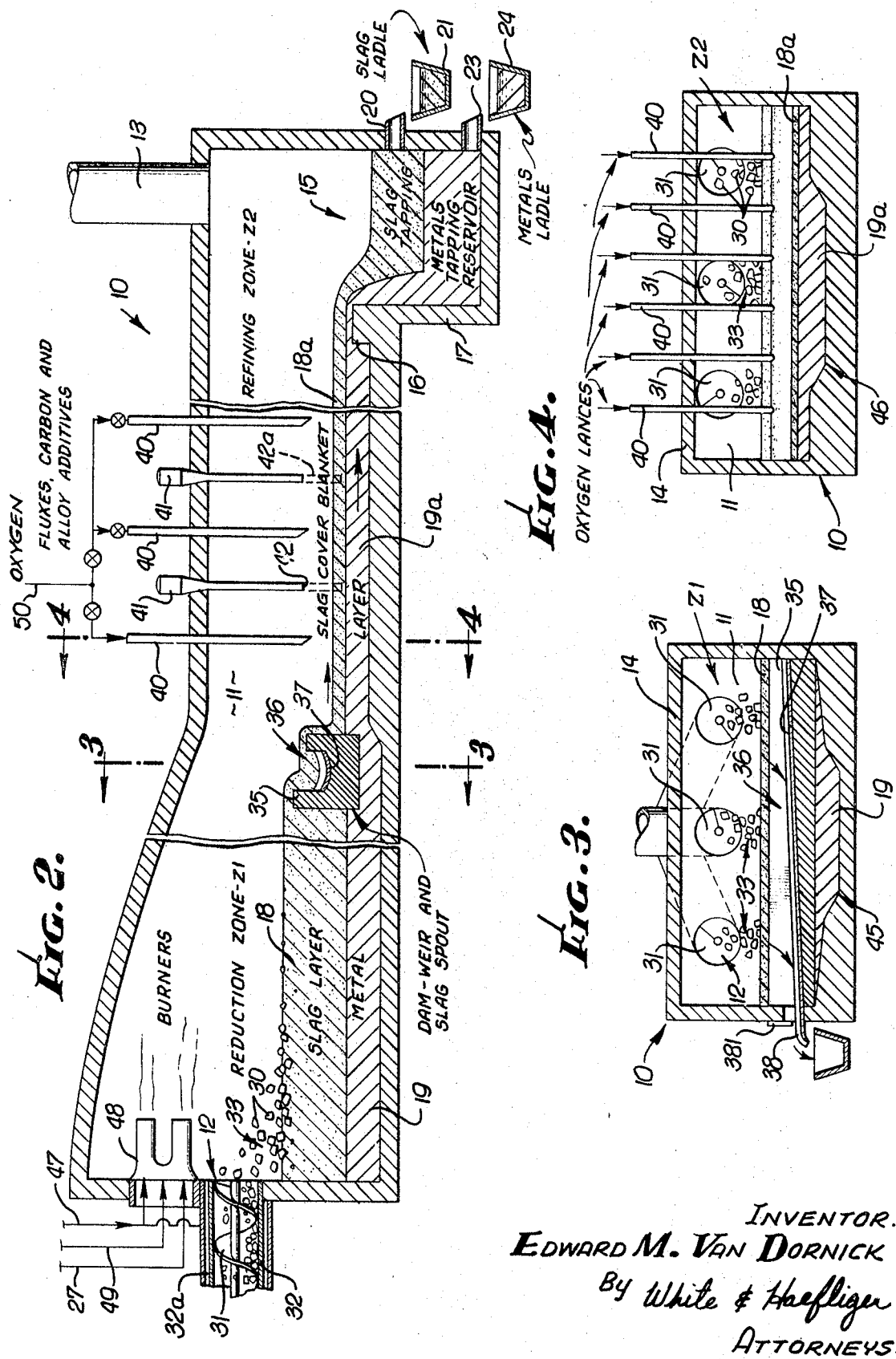

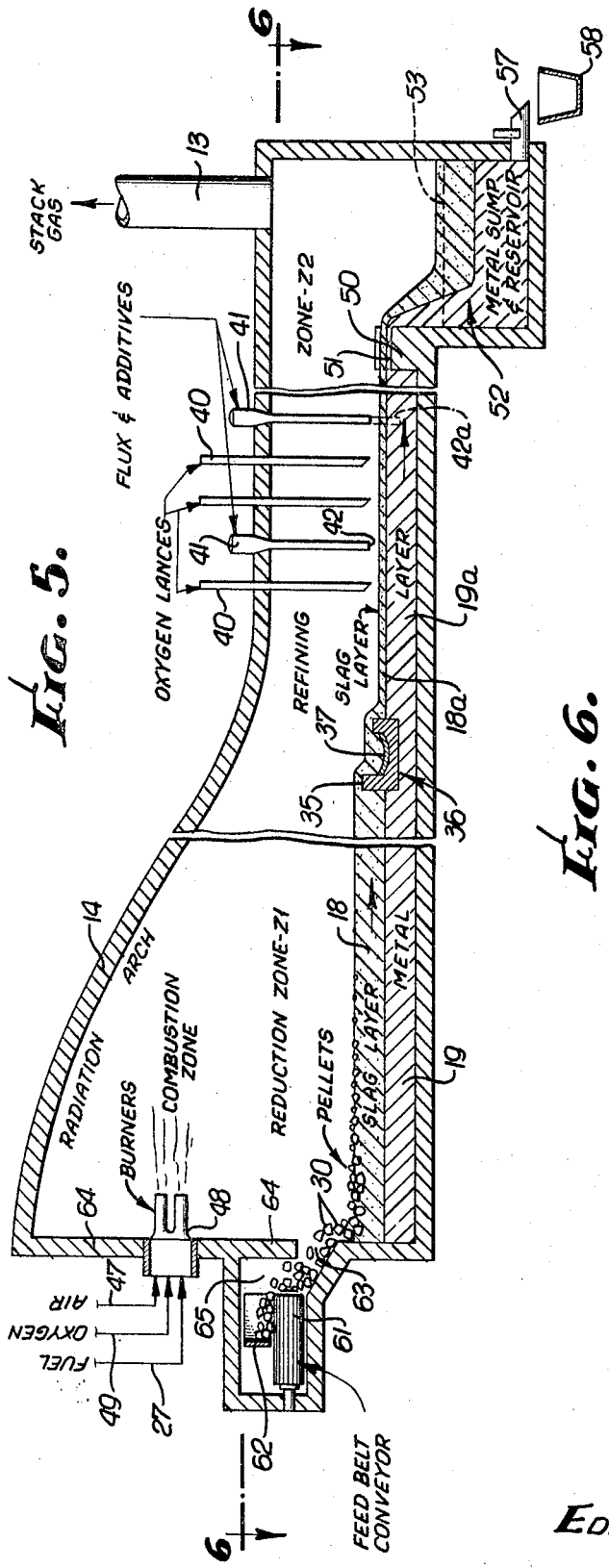

United States Patent Office 3,525,604
Patented Aug. 25, 1970

3,525,604
PROCESS FOR REFINING PELLETIZED
METALLIFEROUS MATERIALS
Edward M. Van Dornick, 3716 E. Corta Calle,
Pasadena, Calif. 91107
Filed Oct. 21, 1966, Ser. No. 588,535
Int. Cl. C21b 11/08, 13/08, 13/14
U.S. Cl. 75—40
14 Claims

ABSTRACT OF THE DISCLOSURE

Metalliferous and carbonaceous material are pelletized and fed to the reduction section of an elongated furnace in which the pellets float within a slag layer while their metalliferous content undergoes reduction with metal separation below the slag, both the slag layer and metal being in continuous flow in the longitudinal direction of the furnace into a refining section in advance of which a portion of the slag is withdrawn to leave a relatively thin layer blanketing and flowing in the same direction as the underneath metal undergoing refining.

---

This invention relates to an improved process for the reduction and refining of metalliferous materials to obtain by a relatively simple and brief sequence of operating conditions and effects, metallic products notably, but not necessarily exclusively, in the category of high quality metals, alloys, steel and alloy steels resulting directly from the properties given the metallic product as a consequence of the manner and conditions according to which their combined forms or states are reduced and refined and the metallic products are recovered essentially as such. With respect to terminology, "essentially" metallic products are understood to be inclusive of steels or alloys typically analyzing in excess of 95% metallic content but with carbon or other components present, depending upon the end products desired and also the composition of particular materials reduced.

Preliminarily it may be observed that the invention is capable of producing by direct carbonaceous reduction, metallic products from a broad range of natural and synthetic chemically bound metal compounds of iron, chrome, nickel, manganese, molybdenum, vanadium, etc. such as for instance, metalliferous ores, minerals, slags, chemicals and other metal-containing industrial products, by-products, and wastes, which collectively are termed metalliferous materials.

Where it is desired to produce high quality metallic products as the direct or immediate product, the invention presents outstanding advantages over and in contrast with conventional metal producing processes requiring according to their particular types and objectives, blast furnace ore reduction or electrolytic or chemical conversion of the minerals to metals, over many hours and great expense of operation, whereas the present invention provides for direct reduction and refining of the metalliferous material within a period of one hour. Inasmuch as the several metalliferous materials may be intimately mixed and compactly associated, the liberation of the metal atoms and molecules by the later described reduction conditions, effects an association of the atoms and molecules of the various nascent metals that is productive of extraordinary superior quality of metal or metal alloy.

Whereas the historical concept continuing strongly to present-day operations in the steel and other smelting activities concerned with the reduction of oxides to metals, is strongly stated to be a reduction reaction carried out by a gaseous reducing agent, such as carbon monoxide, my invention appears to demonstrate that the reduction reaction between a reducing agent such as carbon and a metallic oxide is much more readily accomplished as a solid or liquid phase reaction at a temperature in the range of about 3000 to 3600° F. Inasmuch as most of the metallic oxides are fluid at this temperature it is difficult to affirm with authority that the reaction may not in fact be a liquid-solid reaction of metal oxide and solid carbonaceous reducing agent. However, the precise reaction mechanisms need not be completely known or understood so long as they produce the desired results of high purity, high quality metal and alloy products which in fact the present invention does accomplish.

The invention more particularly is directed to amplifications and improvements in the processes of my co-pending application Ser. No. 366,462 filed jointly with Merrill W. MacAfee on May 11, 1964, now Pat. No. 3,340,044.

In common with that process the present invention is predicated upon initially placing ground metalliferous material in a form of physical compacted admixture with carbonaceous reducing agent, and also ordinarily with appropriate fluxing agent and binder, for unique relation to radiant and molten slag heating media and in an environment within which the reduction and freed metal particle separations occur. Ground metalliferous materials together with reducing agent and binder, and also fluxing material when required, are agglomerated in the form of what may be termed pellets, contemplating that the latter are to be in lump form with any of various possible shapes such as briquettes, cylindrical extrusions or other forms resulting from the use of available pelletizing, compacting, briquetting or extrusion equipment. Of primary concern is that the pellets be of such size and shape, and have such compaction of their components and binder, as to maintain the metalliferous material and carbonaceous reducing material in such intimacy as will assure rapid reduction of the metalliferous material and release of its metallic component or components.

The present process may be generally characterized as employing successive, continuously related stages, the first being a metalliferous reduction and metal release stage, and the second being a refining stage operating to serve any of such purposes as purification of the metal phase from the first stage, and adjustment, variation or alloying of the metal phase to meet product requirements. For the reduction stage (as in the application referred to above) I maintain within an elongated furnace zone an upper molten slag layer and a bottom molten metallic layer, and introduce the pelletized feed to the slag layer to have buoyant flotation therein and thereon, providing for efficient radiant and melt-to-solid heat transfer. Unlike the customary lower temperature reduction processes, the furnace is internally fired to maintain the slag layer at unusually high temperature, preferably within the range of about 3000° F. to 3600° F., so as to assure the desired reduction of the metalliferous material with rapid continuity through the successive stages to freed metallic particles. For direct metal production, the density and viscosity of the slag layer may be controlled by proper fluxing to allow the metallic droplets to settle through the slag layer to the metal layer below, thus effecting immediate removal of the particulate metal from what otherwise might be contaminating influences in the slag or gases being generated by the reduction and combustion.

Whereas the pellet composition and method of accomplishing the chemical reactions in a protective slag environment so minimize contamination of the metal as to produce a superior quality metal which frequently will qualify as a specification product, the present invention aims to assure complete control over purity of the product and any composition or alloying adjustments by a subsequent refining zone wherein final specifications can be achieved under laboratory control and additive additions as required to insure a controlled specification product.

The invention has as an important object to relate the reduction and refining zones or stages of the process for continuous flow therethrough of the lower metal layer separating in the first stage and also of the upper slag layer, but in a manner permitting partial elimination of the initial relatively heavy slag layer so that in flowing through the refining zone an adequately protective slag blanket will remain but its depth will have been so reduced as to permit introduction to the metal layer below of refining agents such as oxygen, fluxes, carbon and alloying addiitves.

Specifically contemplated is provision for withdrawing from the furnace between the reduction and refining stages a continuous flow of slag while permitting a blanketing residue to remain and continue through the refining stage, all in a manner such that the metal layer undergoing final refining may be reached through the slag blanket while flow through the furnace remains continuous to final drawoff and separation of slag from the metal product.

Further objectives of the invention are directed to relative variations in the reducing and refining zone dimensions and configurations, to the end that each will be designed for efficient performance of its respective function, i.e. metal separation in the reducing stage and refinement of the separated metal in the second stage. Accordingly the invention aims to efficiently adapt the reducing stage, dimensionally or otherwise, for adequate slag retention and heating as well as the reduced metal separation and removal, and to adapt the second stage with primary regard to bottom metal layer retention as required for purification purposes, as well as the maintenance of reduced slag cover.

It is contemplated that such considerations and adaptations may warrant variations in the furnace sections defining the two zones as for example by relatively shortening the refining stage as where the added agents such as oxygen, fluxing, carbonizing and alloying materials are given lateral distribution in the chamber, whereas in other instances the refining zone may be relatively narrowed and extended as to better accommodate refining aid or additive introduction to the metal at locations distributed longitudinally of the chamber. In all instances however, the chamber design will be predicated upon necessary residence time for the metal to assure its complete treatment to the desired end product.

All the features and objects of the invention as well as the details of an illustrative embodiment will be further understood from the following detailed description of the accompanying drawings in which:

FIG. 2 is a longitudinal vertical central cross section taken through the furnace;

Figure 1:
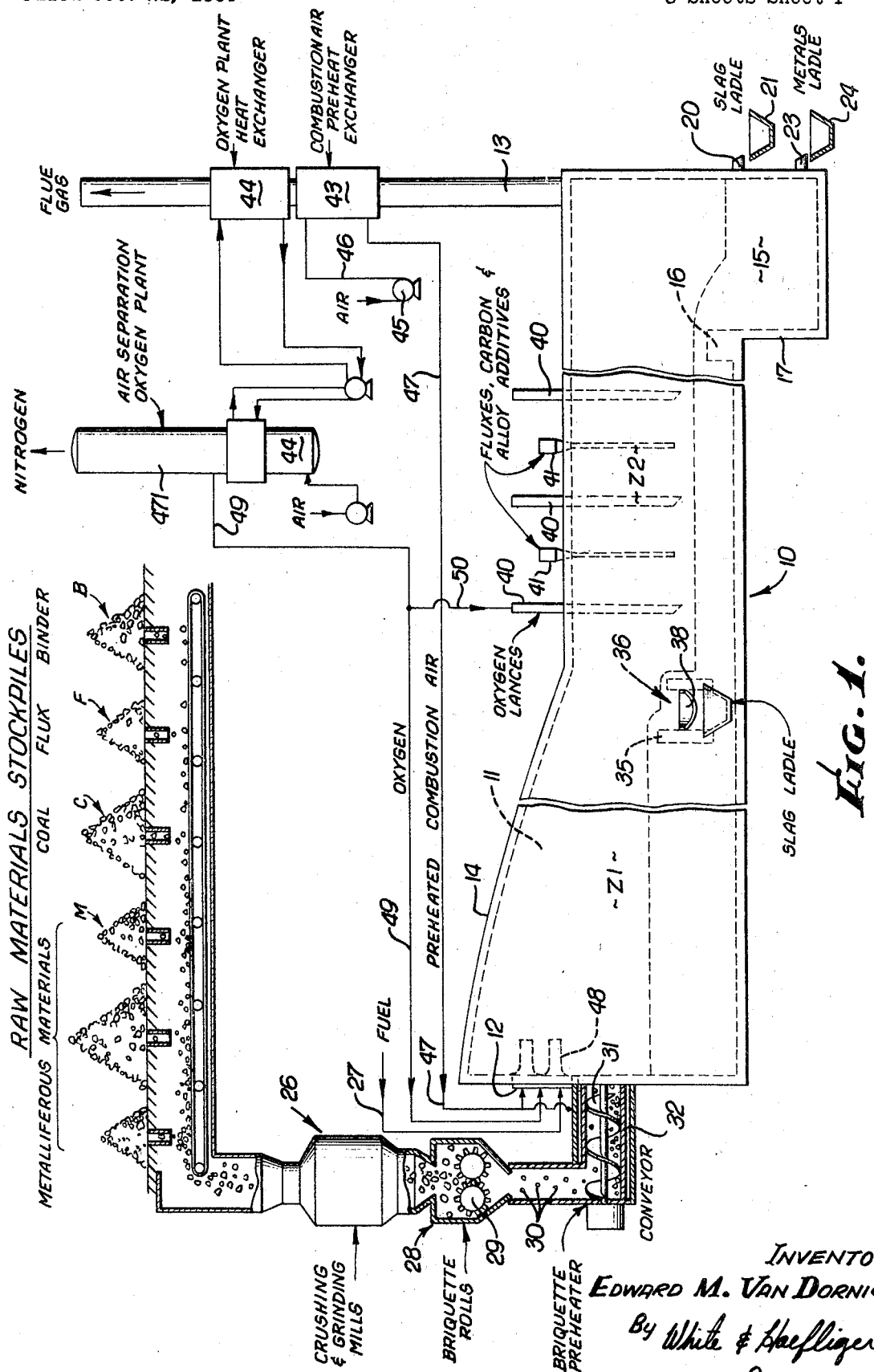
FIG. 1 is a view generally diagrammatic and in flow sheet form illustrative of one embodiment of the invention.

FIGS. 3 and 4 are cross sections respectively on lines 3—3 and 4—4 of FIG. 2;

FIG. 5 is a view similar to FIG. 2 showing a variational form of the furnace; and FIG. 6 is a plan cross section taken on line 6—6 of FIG. 5.

In reference first to FIG. 1 and the furnace generally indicated at 10, the latter may be constructed with appropriate refractory walls and in elongated form such that the combustion chamber 11 may in a typical commercial instance extend 60 to 100 feet between its inlet 12 and the combustion gas flue or outlet 13. The top wall 14 of the furnace is shown to converge to an outlet and separation sump 15 beyond overflow weir 16 and the end wall 17 of the furnace.

The pelletized metalliferous material fed into the furnace zone Z1 as later explained, converts to an upper slag layer 18 and a lower metal layer 19, the former flowing over dam 35 to be partially withdrawn through slag drawoff 38 and partially continued through the refining zone Z2, ultimately to overflow weir 16 into sump 15 from which the slag is continuously or intermittently withdrawn through outlet 20 into ladle 21 or other disposal. Metallic layer 19 underflows dam 35 into zone Z2 for refining as with oxygen, fluxes and additives to controlled specifications, finally overflowing weir 16 to accumulate in zone 15 from which the metal is withdrawn continuously or intermittently through outlet 23 into ladle 24 or other disposal.

The metalliferous materials typically ferrous or ferrous and non-ferrous mixtures, fed to the system typically from stock piles at M may vary widely in grade, ranging from low grade of say one percent nickel content or 25% iron content to high grade ores or other metalliferous materials sources such as 48% chromic oxide ores, Quebec magnetite or mill scale at 65 to 70% iron content or 48% manganese metalliferous content. The feed is delivered to suitable mixing and crushing equipment diagrammatically indicated at 26, in which the material is reduced to particle size preferably in the −10 to +100 mesh range. Into the mixing and grinding equipment may also be introduced suitable binder materials B and fluxing materials F which may be of any known type of composition capable of pellet binding and fluxing fusion of the slag to form layer 18 in the furnace. Preferred because of their low cost availability, are such fluxing agents as limestone, dolomite, fluorspar and glass cullett such as calcium-containing ground bottle glass. The fluxing material passes through the mixing and grinding equipment 26 for fineness reduction comparable with the crushed ore. As reducing agent I employ suitable carbonaceous material C such as coal, petroleum or coal coke, pure carbon or natural bitumen, which is ground and mixed with the metalliferous and fluxing materials by delivery to stage 26. Crushed coal or coke may also be fed through line 27 for combustion within the furnace zone 11. Oil or gas may also be used additionally or alternatively as combustion fuel.

In reference to the grinding stage 26, it is contemplated that the various feeds may be ground separately or in any combination and suitably mixed before or after grinding to produce a mixture appropriate for pelletizing.

In order to insure integrity of the pellets to be formed, I ordinarily use also a binder material B which may be either or both organic or inorganic composition. Illustrative organic binders are tar, asphalt, resins, pulp mill wastes, waste polymers, molasses, starches, coal tar and native bitumens. Typical inorganic binders are kaolin clay, montmorillonite, slags, portland cement, lime, fullers earth, water softener residues, magnesium oxy chloride. When required, the binder material may pass through the grinder stage 26 wherein the pellet components are thoroughly and uniformly admixed for delivery to suitable pelletizing means generally indicated at 28.

Typically the prepared admixture may be converted to pellets in lump or briquette form by passage between briquetting rolls 29 which compact the materials into bodies of suitable size and volume, e.g. in the range of about 1.0 to 50 cubic inches. The pellets 30 then pass to conveyors 31 operating within casings 32 to discharge the pellets at 33 into the slag layer 18. If desired, the pellets may be preheated as by hot air circulated through the conveyor casing jackets 32a as later explained.

By pellet density control and controlled fluxing where necessary, the density and viscosity of the slag layer 18 may be so maintained as to cause the pellets to float with partial emergence of submergence in the molten slag. Upon entering the 3000 to 3600° F. (slag temperature) radiant heat reduction zone Z1 the pellets undergo rapid heating with proportionately rapid reduction reaction of their metalliferous material content made possible by the combination of high temperature heating and intimate and uniform contact of the crushed metalliferous material particles with the carbonaceous reducing agent.

Rapidity and uniformity of fluxing also results from the high slag and radiant temperature and intimacy and uniformity of distribution of the fluxing agent throughout the pellets. The latter are carried by and in the slag as it flows through the reduction zone Z1, and during the course of their travel the pellets progressively reduce in size in a manner that may be somewhat similar to exfoliation or abalation, to the extent of complete disintegration and fusion before passage from this zone. An observed effect appearing at the surfaces of the pellets is the formation of small metallic droplets or beads which separate from the pellet and pass into the slag layer. For coalescence and separation of the metal, the pellet density is adjusted and the slag layer is fluxed to density allowing floating partial submergence or emergence of the pellets, and with the slag viscosity sufficiently low that the higher density metallic droplets upon separation from the pellets will promptly settle into and coalesce within the bottom layer 19.

Coming now to the reduction and refining sequences with which the invention is more particularly concerned, these sequences involve the operation and effects of the furnace reduction zone Z1 and the refining zone Z2 in continuing open communication therewith. In the reduction zone, the nonmetallic residue accumulate as a relatively thick or heavy fused slag layer 18 as may be governed by the height of weir 35. A major purpose of course in maintaining in zone Z1 the greater slag depth is to assure maintenance of the necessary pellet flotation and quantity and heat retentiveness of the slag heating medium to serve the purpose of the metalliferous material reduction occurring in the pellets 30.

In passing the weir 35 the top portion of the slag layer overflows into suitable means for partially withdrawing the slag stream from the furnace. Such means is shown typically to comprise, by formation with the weir, a refractory wall trough 36 extending the width of the zone Z1 and having its bottom constituted as what may be termed draw-off channel 37 passing through one side of the furnace for discharge of the slag through spout 38 to suitable ladle or other disposition, the drawoff being suitably controlled as by gate or weir valve 381. The bottom metals layer 19 underflows the weir and slag drawoff assembly to continue through the refining zone Z2 to overflow weir 16 for ultimate separation and recovery through outlet 23 as previously described. The slag drawoff from intermediate the zones leaves a residual relatively thinner slag cover or blanket 18a upon the continuing metal layer 19a, the thickness of the slag layer 18a being sufficient to assimilate and remove refining impurities and to protect the underlying metal from contaminative or other deleterious influences as by contact with the combustion gases going to stack 13, while the slag layer remains sufficiently thin to permit introduction to the metal layer of such agencies or substances as may be desired for control or supplementation of the metal to its final composition as delivered from the outlet 23. The slag and bottom metal layers flow continuously through the furnace, except for the intermediate slag drawoff, and both of the slag and metal layers 18a and 19a overflow weir 16 for separation in and recovery from the sump 15.

The treatment given the metal layer in the refining zone may be for any of such purposes as purification of the metal from a composition essentially established in the reduction zone Z1, or for such purposes as the incorporation of carbon or alloy additives in the metal, or for any combination of all these purposes.

Thus for purification by oxidation of impurities convertible and removable from the metal by oxidation, oxygen may be itroduced by techniques known insofar as oxygen introduction per se is concerned, as by blasting oxygen from one or more conduits or lances 40 arranged either or both transversely and longitudinally of the refining zone and which may enter the zone through the top of the furnace generally toward the feed end as illustrated.

The oxygen lance or lances may be supplied with oxygen under necessary pressure as from the later described oxygen separation plant. In accordance with known oxygen delivery techniques, oxygen may be blasted from the lance or lances 40 downwardly against the surface of the slag covering 18a at velocity sufficiently high to locally displace the slag, thus permitting direct oxygen-to-metal contact and penetration of oxygen into the molten metal. Also the lance or lances may be suitably mounted for vertical adjustment to penetrate through the slag layer into the under lying metal so that the oxygen discharge directly enters the metal. It follows of course that depending upon operating conditions and desired oxidizing effects, particularly taking into consideration possible introduction of additives, the lance position may be shifted to be at times above the slag and at other times below and directly into the metal. The oxygen blast agitation also mixes the slag with the metal to effect removal by the slag of the refining impurities.

Allowing e.g. for about 30 minutes residence time of the metal undergoing oxygen treament in the refining zone, the rate of oxygen delivery from the lance or lances typically may be at about 2000 standard cubic feet per ton of metal product and at a supersonic blast velocity of approximately 1200 to 1500 linear feet per second.

Additives such as carbon for adjusting the metal composition, e.g. to that of an accurately controllable carbon percentage steel, with or without alloy additives such as nickel, chromium, manganese and the like, and fluxing agents as lime, limestone, fluorspar, etc. may be suitably introduced to the metal in the refining zone as from feeder or feeders 41 which may discharge at 42 directly upon or into the slag layer 18a, or the discharge may be extended as indicated by the broken lines 42a for delivery of the additive or additives below the slag layer and directly into the metal 19a. The length of the refining zone beyond the location of oxygen and additive inputs to the overflow weir 16 will be sufficiently extended to assure uniformity in the final composition of the metal as effected by such oxidation or additive supplementation.

In reference to overall considerations, the furnace shape and dimensions longitudinally and laterally will be determined to provide for ample residence time for the reduction and refining operations in relation to the metalliferous feed and throughput rate. For example, in the described embodiment of the invention the furnace is shown to be of uniform width at both the reduction and refining zones. Longitudinally the zone extents may be relatively varied in accordance with the time intervals required for their respective reduction and refining function. Generally it is contemplated that the residence time for the pellets, slag and metal in zone Z1 may be not in excess of 30 minutes, and substantially less dependent upon temperature and other conditions, the zone size and extent will be predetermined accordingly. The succeeding refining zone may be predetermined to have relatively greater or lesser extent dependent upon the same considerations applying to the metal refining requirements.

It is also contemplated that the metal receiving bottom configurations of the furnace may be designed for varying distribution of the metal depth transversely of the zones, as by shaping the furnace floor or trough-like configurations at 45 and 46, see FIGS. 3 and 4, to concentrate the metal layer depth at either or both the transverse central extents of the zones.

For purposes of preheating the furnace combustion air, and to provide oxygen supplementation, the furnace hot combustion gases removed through outlet 13 may be passed successively through one or more air preheaters 43 and one or more oxygen plant heat exchangers 44. Furnace burner air is shown to be discharged by blower 45 through line 46 and in indirect heat exchange with the combustion gases in exchanger 43, the preheated air thence being discharged through line 47 for use as primary and secondary air to suitable burners diagrammatically indicated at 48. The oxygen plant heat exchangers 44 supply the heat and energy necessary for the operation of a conventional air separation plant 471 producing the oxygen desired for fuel supplementation and other uses. The oxygen produced is discharged through line 49 directly or indirectly into the furnace fuel combustion or flame zone, by being fed either to burners 48 or directly into the combustion atmosphere. Where preheating of the pellets is desired, a portion of the line 47 air stream may be taken for passage through the conveyor casing jacket 32a. The oxygen production may also feed the lance or lances 40 through line 50.

The variational form of the invention shown in FIGS. 5 and 6 is generally similar to the described embodiment except for transverse variations in the relative dimensions of the reduction and refining zones. As to certain features in common, corresponding reference numerals are used. Here the reduction zone Z1 configuration is shown to be in shape and dimensional correspondence with FIG. 2, but continuing, the furnace reduces transversely at 48 to walls 49 defining a relative narrower refining zone Z-2, as may be permitted by the intermediate draw-off of considerable slag volume from the reduction zone. Thus narrowed, the refining zone can best accommodate oxygen and additive at longitudinal intervals. The same considerations as before, apply to relative dimensioning of the two zones for adequate slag and metal retention, and adequate reduction and refining time periods.

In FIGS. 5 and 6 the slag and refined metal layers 18a and 19a are shown to overflow dam 50 through its weir notch 51 into a separation sump 52 from which the floating slag overflows weir 53 into a secondary sump 54 to be withdrawn at suitable controlled rate through outlet 55 into ladle 56 or other disposition. The bottom metal layer 56 in sump 52 is similarly withdrawn through outlet 57 into ladle 58 or elsewhere. As will be understood the furnace floor sections in either or both zones Z1 and Z2 may be essentially flat, giving transverse uniformity to the metal layer depths, or the zone floors may be channeled as previously described with reference to FIGS. 3 and 4.

Also in FIGS. 5 and 6 I show a variational type of pellet feed to the reduction zone, calculated to afford uniform distribution of the pellets into the molten slag transversely of the molten zone. Here the pellets 30 flowing through duct 60 from briquetting rolls as in FIG. 1, pass onto an endless conveyor 61 at the furnace side of push-off baffle 62 which deflects the pellets from the conveyor uniformly across the furnace feed mount 63 into the slag layer 18. The feed opening 63 is baffled by the furnace wall 64 sufficiently to allow for free flow of the pellets into the furnace, while shielding chamber 65 against the high convection and radiation temperatures in the reduction zone Z1.

In further reference to various metalliferous materials which have successfully been reduced in accordance with the invention to the production of high quality metals and alloys, the following may be cited as illustrative: Chromic oxide, nickel oxide, iron oxide, chrome ore, nickel ore, mill scale, iron sands, manganese ore, vanadium ore, molybdenum ore, New Mexico Iron Mountain magnetite concentrate, Jamaica bauxite red mud, East Tennessee limonite, New Caledonia nickel saprolite, Columbia nickel laterite, Arizona hematite, Anaconda Copper Reverb. slag, Quebec magnetite and Spokane chrome electric smelter slag.

The carbonaceous reducing agent content of the pellets will of course be dependent upon the metalliferous material to be reduced, but will be in excess say by 25% to 100% of the stoichiometric amount of carbon theoretically required. Binder content may vary e.g. between 5 and 25% weight percent, depending upon the binder, and the slag fluxing agent may vary from none to as high as 50%, depending on the gangue and metalliferous material and the desired slag properties.

The following are examples showing typical metalliferous material analyses, pellet compositions and product analyses and recoveries with reaction or slag temperatures in each instance.

EXAMPLE I

| Component: | Pellet, wt. percent |
|---|---|
| Iron oxide | 42.7 |
| Chromic oxide | 11.2 |
| Nickel oxide | 4.57 |
| Coal | 31.2 |
| Binder (clay) | 10.33 |

Reduction zone product, slag layer temperature 3250° F.

| Component: | Pellet, wt. percent |
|---|---|
| Iron | 71.67 |
| Silicon | 1.12 |
| Chromium | [1] 17.4 |
| Nickel | 8.90 |
| Carbon | [2] 0.91 |
| | 100.00 |

[1] Slag–Fluorospar.
[2] Metals recovery 98%.

Refining stage, 30 min. residence time; oxygen blowing, 2000 st. cu. ft./product ton at approximately 1500 ft./sec. lineal velocity; product: stainless steel.

| Component: | Pellet, wt. percent |
|---|---|
| Iron | 72.89 |
| Chrome | 18.65 |
| Nickel | 8.35 |
| Carbon | 0.11 |
| | 100.00 |

EXAMPLE II

| Component: | Pellet, wt. percent |
|---|---|
| Iron oxide | 49. |
| Chromic oxide | 9.2 |
| Coal | 27.0 |
| Binder | 14.8 |
| | 100.00 |

Reduction zone product, slag layer temperature 3350° F.

| Component: | Pellet, wt. percent |
|---|---|
| Iron | 83.75 |
| Silicon | 0.86 |
| Chromium | [1] 14.7 |
| Carbon | [2] 0.69 |
| | 100.00 |

[1] Slag—bottle glass.
[2] Metals recovery 98%.

Refining stage, 30 min. residence time; oxygen blowing, as in Ex. I; additives, nickel and molybdenum to following contents; product, corrosion resistant casting steel.

| Component: | Pellet, wt. percent |
|---|---|
| Iron | 83.45 |
| Chromium | 15.3 |
| Nickel | 0.5 |
| Molybdenum | 0.5 |
| Carbon | 0.25 |
| | 100.00 |

EXAMPLE III

| Component: | Pellet, wt. percent |
|---|---|
| Ore (Ferro Nickel) | 58.82 |
| Coal | 23.53 |
| Binder | 18.65 |
| | 100.00 |

Reduction zone product, slag layer temperature 3200° F.

| Component: | Pellet, wt. percent |
|---|---|
| Iron | 76.24 |
| Nickel | [1] 18.22 |
| Silicon | [2] 3.5 |
| Carbon | 2.04 |
| | 100.00 |

[1] Slag—bottle glass.
[2] Metals recovery 93%.

Refining state, resistance time 30 minutes; oxygen blowing, as in Ex. I; additives, ferro-chrome to the following composition; product: stainless type HH.

| Component: | Pellet, wt. percent |
|---|---|
| Iron | 61.80 |
| Chrome | 25.77 |
| Nickel | 12.43 |
| | 100.00 |

EXAMPLE IV

| Component: | Pellet, wt. percent |
|---|---|
| 25% iron ore | 45.98 |
| Limestone | 32.18 |
| Coal | 17.24 |
| Binder | 4.60 |
| | 100.00 |

Reduction zone product, slag temperature 3200° F.

| Component: | Pellet, wt. percent |
|---|---|
| Iron | 94.76 |
| Silicon | [1] 2.50 |
| Carbon | 2.22 |
| Copper | 0.024 |
| Titanium | 0.2 |
| Manganese | 0.27 |
| Chromium | 0.01 |
| Nickel | 0.01 |
| | 0.000 |

[1] Metals recovery 98%.

Refining stage, residence time 30 minutes; oxygen blowing, as in Ex. I; additives, ferro-manganese to the following composition; product: structural grade steel.

| Component: | Pellet, wt. percent |
|---|---|
| Iron | 98.78 |
| Carbon | 0.40 |
| Manganese | 0.80 |
| Chromium | [1] 0.01 |
| Nickel | 0.01 |
| | 100.00 |

[1] Structural grade steel.

I claim:
1. The process of obtaining a metallic product by reaction and reduction of a metalliferous material in which metal to be recovered is chemically combined, that includes maintaining in a high temperature furnace reduction zone a molten upper slag layer, introducing to and floating within said slag layer pelletized bodies of ground metalliferous material admixed with carbonaceous reducing material thereby causing molten metal particles to form and release from said bodies into a lower molten metal layer while the bodies progressively reduce in size leaving residual slag in the slag layer, flowing said layers from said reduction zone into a refining zone and removing a portion of said slag layer to leave a relatively thin slag blanket upon and flowing with an in the same direction as the metal layer in the refining zone to predetermined variation of its composition, and removing the slag blanket and metal layer from the same end of the refining zone.

2. The process of claim 1, in which said reduction zone is internally fired and the relative densities of said bodies and slag layer are such that the bodies remain at the surface of the slag layer while undergoing radiant and slag heating.

3. The process of claim 1, in which said slag layer in the reduction zone is maintained at a temperature in the range of about 3000° F. and 3600° F.

4. The process of claim 1, in which said bodies contain also a fluxing agent and a binding agent.

5. The process of claim 1, in which an additive of the group consisting of a carbonaceous material, a metal and metallic alloy is added to the metal layer in the refining zone.

6. The process of claim 1, in which gaseous oxygen and fluxing agents are introduced to the metal layer in the refining zone.

7. The process of claim 6, in which an additive of the group consisting of a carbonaceous material, a metal and metallic alloy is added to the metal layer in the refining zone.

8. The process of claim 1, in which said slag layers and metal layer flow continuously through said reduction and refining zones and are separately withdrawn from the refining zone.

9. The process of claim 8, in which said zones are successive elongated interior sections of an extended furnace, the reduction zone being internally fired to produce hot gases flowing through both zones, said slag layer being partially removed by lateral flow from a location between the zones.

10. The process of claim 9, in which fluxing agents and gaseous oxygen are introduced downwardly into the metal layer in the refining zone.

11. The process of claim 9, in which an additive of the group consisting of a carbonaceous material, a metal and metal alloy is added to the metal layer in the refining zone.

12. The process of claim 11, in which fluxing agents and oxygen are introduced downwardly into the metal layer in the refining zone.

13. The process of claim 9, in which said slag layer in the reduction zone is heated to a temperature in the range of about 3000° F. and 3600° F.

14. The process of claim 13, in which said metalliferous material is a ferrous material and the composition of the metal layer withdrawn from the refining zone is essentially that of steel.

References Cited

UNITED STATES PATENTS

| 596,991 | 1/1898 | Garretson | 266—11 X |
| 596,992 | 1/1898 | Garretson | 266—11 X |
| 2,356,524 | 8/1944 | Lohse | 75—40 |
| 2,557,650 | 6/1951 | Gilliland | 75—40 |
| 3,171,877 | 3/1965 | Thring | 75—46 |
| 3,326,671 | 6/1967 | Worner | 75—40 |
| 3,340,044 | 9/1967 | MacAfee et al. | 75—40 |

FOREIGN PATENTS 740,492 11/1955 Great Britain.

HENRY W. TARRING II, Primary Examiner

U.S. Cl. X.R.

75—46, 60, 89, 92

UNITED STATES PATENT OFFICE
CERTIFICATE OF CORRECTION

Patent No. 3,525,604           Dated August 25, 1970

Inventor(s) Edward M. Van Dornick

It is certified that error appears in the above-identified patent and that said Letters Patent are hereby corrected as shown below:

In the Claims, in Claim 1, at line 1, column 10, after "zone", the following should be inserted:

--, treating the metal layer in the refining zone--

SIGNED AND SEALED
NOV 17 1970

(SEAL)
Attest:

Edward M. Fletcher, Jr.
Attesting Officer

WILLIAM E. SCHUYLER, JR.
Commissioner of Patents